Sept. 11, 1923.  
C. L. HYDE  
1,467,580
AUTOMOBILE SIGNAL
Filed April 23, 1921
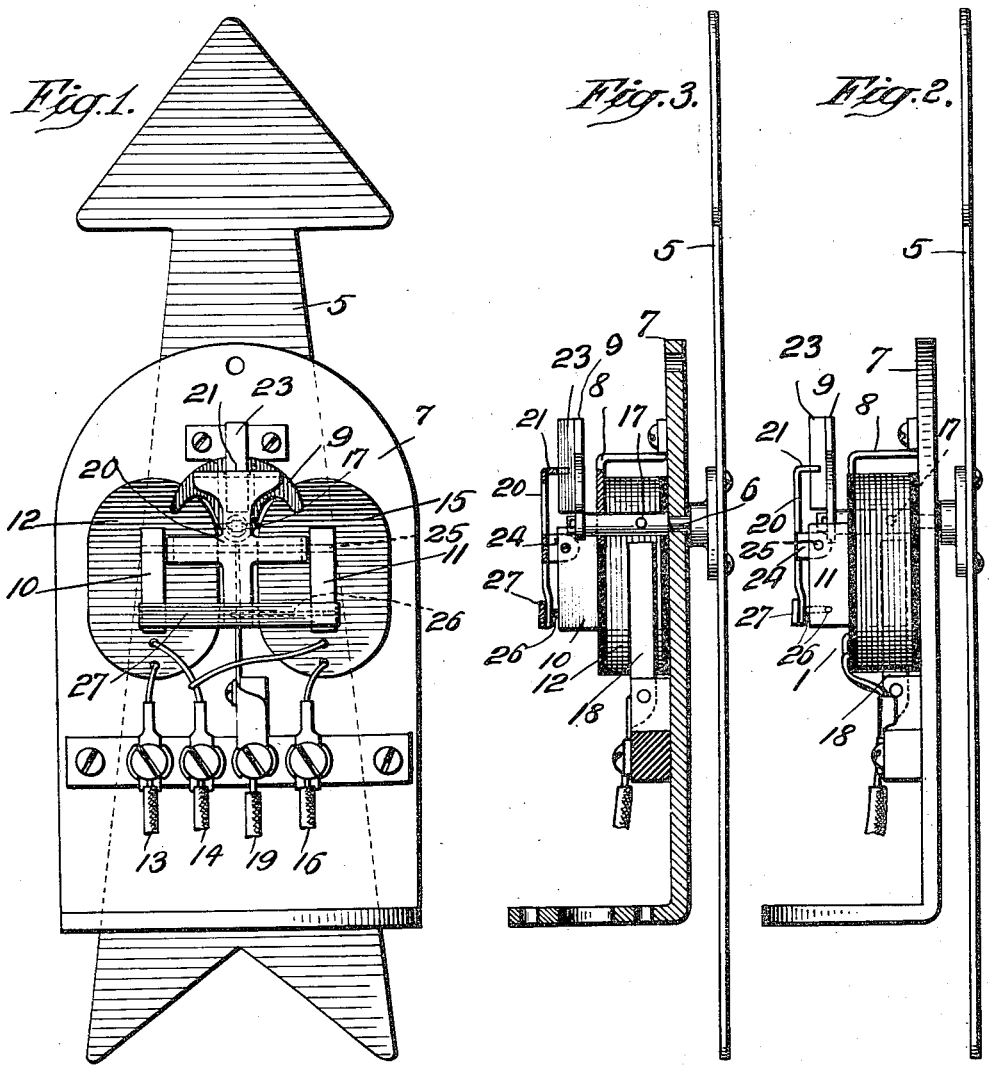
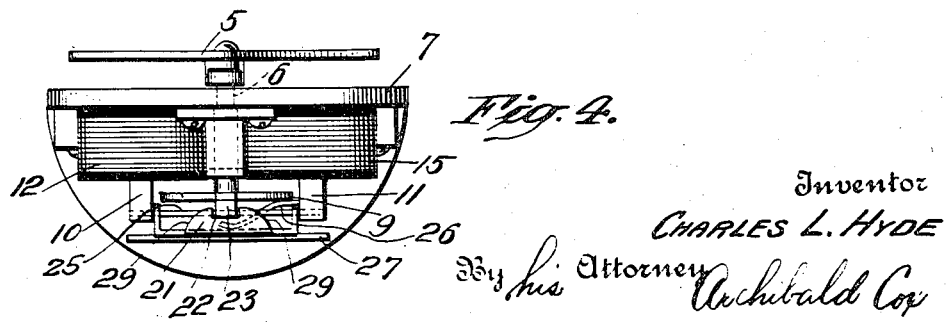
Inventor  
CHARLES L. HYDE  
By his Attorney  
Archibald Cox Patented Sept. 11, 1923.

1,467,580

UNITED STATES PATENT OFFICE.

CHARLES L. HYDE, OF PLAINFIELD, NEW JERSEY.

AUTOMOBILE SIGNAL.

Application filed April 23, 1921. Serial No. 463,778.

*To all whom it may concern:*

Be it known that I, CHARLES L. HYDE, a citizen of the United States, residing at Plainfield, in the county of Union and State of New Jersey, have invented certain new and useful Improvements in Automobile Signals, of which the following is a specification.

The invention relates to an improvement in automobile signals, and more particularly to an improvement in the automobile signal disclosed in my Patent No. 1,356,150, dated October 19, 1920. The object of the invention is to provide an automobile signal having a pointer for indicating the contemplated movement of the vehicle, with improved and simplified means for holding the pointer or other direction indicator locked in normal or non-indicating position until the driver of the vehicle desires to indicate in which direction he intends to turn the vehicle. With this object in view, the invention consists in the improved automobile signal hereinafter described and particularly pointed out in the appended claims.

In the accompanying drawings illustrating the preferred form of the invention Fig. 1 is a rear elevation of the improved automobile signal with the casing removed to expose the pointer actuating parts; Fig. 2 is a side elevation of the parts shown in Fig. 1; Fig. 3 is a vertical section of the parts shown in Fig. 2; and Fig. 4 is a plan view.

The pointer actuating parts of the improved automobile signal, as illustrated in the drawings, are substantially the same in construction and mode of operation as the corresponding parts of the automobile signal disclosed in my said patent. It will, accordingly, not be necessary to describe these parts in detail. In its general features of construction the illustrated automobile signal comprises a pointer 5 fixedly mounted on the outer end of a shaft 6 journaled in a plate 7 and in a bracket 8 secured to the plate 7. On the rear end of the shaft 6 is fixed a crescent-shaped armature 9. The armature is actuated upon the energization of a magnet having two arms or cores 10 and 11, each surrounded by a coil of wire. The coil 12 of the arm 10 is in the circuit formed by the wires 13 and 14; and the coil 15 surrounding the arm 11 is in the circuit formed by the wires 16 and 14. These circuits are closed in the usual and well known manner. When the magnet arm 10 is energized, the pointer is swung to point in a left hand direction; and when the arm 11 is energized, the pointer is swung to point in a right hand direction. When the pointer is in either direction indicating position, a pin 17 which passes through the shaft 6 is brought into contact with the upper end of a leaf spring 18 constituting the free terminal of a wire 19 which forms one side of a circuit in which a return or audible signal is located, thereby informing the vehicle driver or operator that the signal is in direction indicating position, all as fully explained in my said patent.

In order that the pointer may not be accidentally or manually moved out of normal or non-indicating position, which is the position shown in the drawings, the present invention provides improved and simplified means for holding the pointer locked until by the closing of either circuit the pointer is to indicate the contemplated movement of the vehicle. The improved and simplified pointer holding or locking means comprises a lock 20 of non-magnetic material having an offset end 21 provided with a notch 22 adapted to engage the thickened middle portion 23 of the armature. The pointer lock 20 is roughly in the form of a Greek cross having a flared upper end. The ends of the side arms of the lock are inturned to form ears 24 provided with bearing holes whereby the lock is journaled upon a pin or stud 25 fixed in the outer ends of the magnet arms 10 and 11. The above construction is such that the pointer lock 20 may be pivotally moved into and out of engagement with the armature. The lock is normally held in locking engagement with the armature thereby holding the pointer in locked position by means of a leaf spring 26, one end of which is fixed to the magnet arm 11, and the free end of which presses lightly against the under side of the lower end of the pointer lock. In order that the pointer lock may be disengaged from the armature to permit the pointer to swing into either direction indicating position when either circuit has been closed, the lower end of the lock is provided with a cross piece 27 of magnetic material, the lateral ends of which extend over the outer ends of the magnet arms 10 and 11. The construction is such that when either magnet arm is energized upon the closing of its circuit, the cross piece 27 is drawn into contact with the magnet arms against the action of the spring 26, thereby disengaging the notched end 21 of the pointer lock 20 from the thickened middle portion 23 of the armature, and permitting the pointer to swing into direction indicating position.

So long as either circuit is closed, the pointer remains in direction indicating position. When the push button or other circuit controlling means is released, thereby opening the circuit, the magnet becomes deenergized and the pointer is permitted to return into normal position. Upon the deenergization of the magnet, the spring 26, by acting against the cross piece 27, pushes the upper end of the lock 20 into the path of travel of the thickened middle portion of the armature as the latter is swung into normal position by the pointer (it will be understood that the pointer is so mounted that it normally tends to seek the position shown in Fig. 1). To permit the middle portion 23 of the armature to swing past the inturned end 21 of the lock so as to be received in the notch 22, the inturned end 21 of the lock is provided with the rounded portions 29. These rounded portions 29 function as cam surfaces so that as the pointer and armature return into normal position the middle portion 23 of the armature engages the cam surfaces and forces the upper end of the lock outward against the action of the spring 26. When the middle portion 23 of the armature registers with the notch 22, the spring 26 again acts to force the upper end of the lock inward and the armature and pointer are thereby locked in normal position until the next closing of the circuits.

It will be recognized from the above description that the present invention provides a simple and efficient lock for holding the pointer of an automobile signal in normal or non-indicating position until the proper circuit is closed to cause the pointer to be swung to indicate the direction in which it is intended to turn the vehicle. It will be understood that the invention is not to be restricted to the precise form of device shown in the drawings and described above but that it may be embodied in other forms within the following claims.

Having thus described the invention, what is claimed as new is:

1. An automobile signal having, in combination, a normally upright pointer, pointer operating means including a magnet and an armature, and means for locking the pointer in normal position comprising a part adapted to engage the armature and having a part adapted to be actuated by the magnet to disengage the first part from the armature.

2. An automobile signal having, in combination, a normally upright pointer, pointer operating means including an armature and a magnet for actuating the armature, and a lock adapted to engage the armature for normally locking the pointer in its upright position, said lock being adapted to be actuated by the magnet to free the pointer when the magnet is energized to actuate the armature.

3. An automobile signal having, in combination, a normally upright pointer, pointer operating means including an armature and a magnet, and a lock for normally locking the pointer in upright position until the magnet is energized to actuate the armature, said lock having a part for engaging the armature and a part adapted to be acted upon by the magnet to disengage the lock from the armature.

4. An automobile signal having, in combination, a pointer, pointer operating means including an armature and a magnet, and a lock for locking the pointer in normal position, said lock being pivotally mounted and having a part normally in engagement with the armature and another part adapted to be acted upon by the magnet to disengage the lock from the armature.

5. An automobile signal having, in combination, a pointer, pointer operating means including an armature and a magnet, said armature having a thickened middle portion, and a lock for normally locking the pointer, said lock being pivotally mounted on the magnet and having one end offset and provided with a notch adapted to engage the thickened portion of the armature and having a cross piece on its other end in position to be acted upon by the magnet to disengage the offset end from the armature.

6. An automobile signal having, in combination, a normally upright pointer, pointer operating means including a magnet and an armature having an upright middle portion, and a lock for normally locking the pointer in upright position, said lock being pivotally mounted on the magnet and having a notched end which normally engages the middle portion of the armature, means for passing the notched end of the lock into engagement with the armature, said lock having a part in position to be acted upon by the magnet to disengage the notched end from the armature to permit the pointer to swing into direction indicating position.

7. An automobile signal having, in combination, a normally upright pointer, pointer operating means including a magnet and an armature, a lock for normally locking the pointer in upright position, said lock being pivotally mounted on the magnet and spring pressed into engagement with the armature and having a part in position to be acted upon by the magnet to disengage the lock from the armature to permit the pointer to swing into direction indicating position.

CHARLES L. HYDE.